(12) United States Patent
Ito et al.

(10) Patent No.: US 7,542,671 B2
(45) Date of Patent: Jun. 2, 2009

(54) OMNI DIRECTIONAL PHOTOGRAPHING DEVICE

(75) Inventors: Masayuki Ito, Nagano (JP); Osamu Murayama, Nagano (JP)

(73) Assignee: OPT Corporation (JP)

( * ) Notice: Subject to any disclaimer, the term of this patent is extended or adjusted under 35 U.S.C. 154(b) by 345 days.

(21) Appl. No.: 11/428,021

(22) Filed: Jun. 30, 2006

(65) Prior Publication Data

US 2008/0002969 A1 Jan. 3, 2008

(51) Int. Cl.
*G03B 11/00* (2006.01)
(52) U.S. Cl. .............................. 396/544; 348/36; 348/39
(58) Field of Classification Search ................. 396/544, 396/287; 348/36, 39
See application file for complete search history.

(56) References Cited

U.S. PATENT DOCUMENTS

| 2002/0024599 A1* | 2/2002 | Fukuhara et al. ............ 348/169 |
| 2003/0142203 A1* | 7/2003 | Kawakami et al. ............ 348/36 |
| 2004/0001137 A1* | 1/2004 | Cutler et al. ............. 348/14.08 |
| 2004/0027451 A1* | 2/2004 | Baker ........................ 348/46 |
| 2005/0041094 A1* | 2/2005 | Gal et al. ..................... 348/36 |

OTHER PUBLICATIONS

Patent Abstracts of Japan, Publication No. 2003-303335 published Oct. 24, 2003, Tateyama Machine KK and Sony Corp (Appln No. 2002-108489 filed Apr. 10, 2002).
Patent Abstracts of Japan, Publication No. 2004-032782 published Jan. 29, 2004, Microsoft Corp (Appln No. 2003-180216 filed Jun. 24, 2003).
Patent Abstracts of Japan, Publication No. 2004-309568 published Nov. 4, 2004, Shimadzu Corp (Appln No. 2003-099366 filed Apr. 2, 2003).

* cited by examiner

*Primary Examiner*—W. B. Perkey
*Assistant Examiner*—Warren K Fenwick
(74) *Attorney, Agent, or Firm*—Stephen Chin; von Simson & Chin LLP (57) ABSTRACT

Provided is a specific configuration of an omnidirectional photographing device which includes one camera module equipped with a lens for directly taking a 360-degree annular image. More specifically, there is provided an omnidirectional photographing device configured to facilitate carrying. The omnidirectional photographing device includes: one camera module equipped with a lens capable of directly taking a 360-degree annular image; a main body for holding the camera module; and a display unit fixed to the main body, for displaying an image photographed by the camera module.

16 Claims, 6 Drawing Sheets

OMNI DIRECTIONAL PHOTOGRAPHING DEVICE

BACKGROUND OF THE INVENTION

1. Field of the Invention

The present invention relates to an omnidirectional photographing device capable of photographing a 360-degree annular image.

2. Description of the Related Art

Up to now, in a television conference or the like, to simultaneously photograph all participants, an omnidirectional photographing device capable of performing 360-degree omnidirectional photographing has been used in a state of being installed on a conference table or the like. Known as the omnidirectional photographing device of this type is an omnidirectional photographing device which can perform 360-degree omnidirectional photographing by arranging a plurality of camera modules equipped with image pickup elements such as charge coupled devices (CCD) and lenses in a circumferential direction of a disk-shaped camera head. Another omnidirectional photographing device known to have the above type can photograph a 360-degree omnidirectional annular image by arranging a reflecting mirror constituted of a convex mirror in an upper part of one camera module equipped with an image pickup element and a lens. It should be noted that 360-degree omnidirectional photographing can be carried out by rotating a camera module by a rotary-driving mechanism or the like.

None of those omnidirectional photographing devices include a display unit such as a monitor for displaying an image photographed by the camera module or a recording unit such as a hard disk for recording the photographed image. Thus, the image is displayed in a display device connected to the omnidirectional photographing device through a predetermined cable, or recorded in a recording device connected thereto through a predetermined cable.

The above omnidirectional photographing device that includes the camera modules arranged in the circumferential direction of the camera head needs a plurality of camera modules. Even the omnidirectional photographing device that includes one camera module needs a reflecting mirror while only one camera module is needed. In other words, the omnidirectional photographing devices are both complex in configuration. Recently, to simplify such omnidirectional photographing devices more, a camera module (RPU-C251, RPU-C352 or the like by SONY) has been proposed which can directly take a 360-degree annular image by using a special lens having a reflecting surface fixed to its top thus eliminating a necessity of using a reflecting mirror. The camera module of such a type enables 360-degree omnidirectional photographing by one camera module without using any rotary-driving mechanisms or reflecting mirrors.

The omnidirectional photographing device can be simplified in configuration by using the newly proposed camera module. However, the use of the omnidirectional photographing device that employs the newly proposed camera module has just started, and almost no specific configuration has been disclosed.

SUMMARY OF THE INVENTION

It is therefore an object of the present invention to provide a specific configuration of an omnidirectional photographing device which includes one camera module equipped with a lens for directly taking a 360-degree annular image. Specifically, an object of the present invention is to provide an omnidirectional photographing device configured to facilitate carrying.

In order to solve the above problem, according to an aspect of the present invention, there is provided an omnidirectional photographing device including: one camera module equipped with a lens capable of directly taking a 360-degree annular image; a main body for holding the camera module; and a display unit fixed to or integrated with the main body for displaying an image photographed by the camera module.

The omnidirectional photographing device of the present invention includes one camera module equipped with the lens capable of directly taking the 360-degree annular image. Thus, it is possible to photograph the 360-degree annular image by one camera module.

The omnidirectional photographing device of the present invention includes the display unit fixed to or integrated with the main body for holding the camera module to display the image photographed by the camera module. Accordingly, even without disposing any display device separately from the omnidirectional photographing device, the image photographed by the camera module can be displayed in a place where the camera module is arranged. Thus, this omnidirectional photographing device can be easily carried. A cable for interconnecting the display device and the omnidirectional photographing device is made unnecessary. Accordingly, when the omnidirectional photographing device is used on a conference table as in the case of a television conference or the like, neat arrangement can be made on the conference table. Moreover, as the omnidirectional photographing device can be installed while checking the image displayed in the display unit, even when an installing position of the omnidirectional photographing device is frequently moved, the installing position can be easily checked to be changed to a proper position.

In order to solve the above the problem, according to another aspect of the present invention, there is provided an omnidirectional photographing device including: one camera module equipped with a lens capable of directly taking a 360-degree annular image; a main body for holding the camera module; and a recording unit fixed to or integrated with the main body for recording an image photographed by the camera module.

The omnidirectional photographing device of the present invention includes one camera module equipped with the lens capable of directly taking the 360-degree annular image. Thus, it is possible to photograph the 360-degree annular image by one camera module. The omnidirectional photographing device of the present invention includes the recording unit fixed to or integrated with the main body for holding the camera module to record the image photographed by the camera module. Accordingly, even without disposing any recording device separately from the omnidirectional photographing device, the image photographed by the camera module can be recorded in a place where the camera module is arranged. Thus, this omnidirectional photographing device can be easily carried. A cable for interconnecting the recording device and the omnidirectional photographing device is made unnecessary. Accordingly, when the omnidirectional photographing device is used on a conference table as in the case of a television conference or the like, neat arrangement can be made on the conference table.

BRIEF DESCRIPTION OF THE DRAWINGS

In the accompanying drawings:

FIGS. 9A and 9B are imaginary diagrams of images obtained by the camera module shown in FIG. 8, where

DETAILED DESCRIPTION OF THE PREFERRED EMBODIMENTS

The preferred embodiment of the present invention will be described below with reference to the accompanying drawings.

1. Configuration of Omnidirectional Photographing Device

Figure 1:
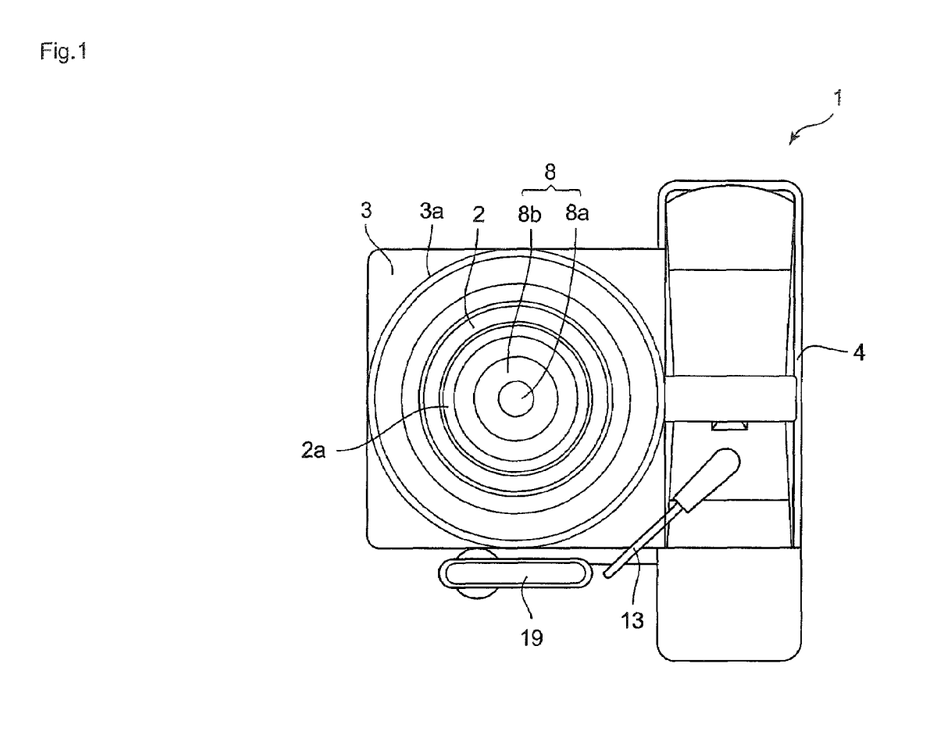
FIG. 1 is a plan view showing an omnidirectional photographing device according to an embodiment of the present invention.

An omnidirectional photographing device 1 of the embodiment is used, for example, in a state of being installed on a conference table to simultaneously photograph all participants of a television conference or the like. This omnidirectional photographing device 1 includes the main body 3 for holding one camera module 2 capable of photographing a 360-degree annular image, and a display recording unit 4 for displaying an image photographed by the camera module 2 and recording the image. It is presumed that a paper surface vertical direction, a left-and-right direction, and an up-and-down direction of FIG. 1 are respectively an up-and-down direction, a back-and-forth direction, and a left-and-right direction.

Figure 7:
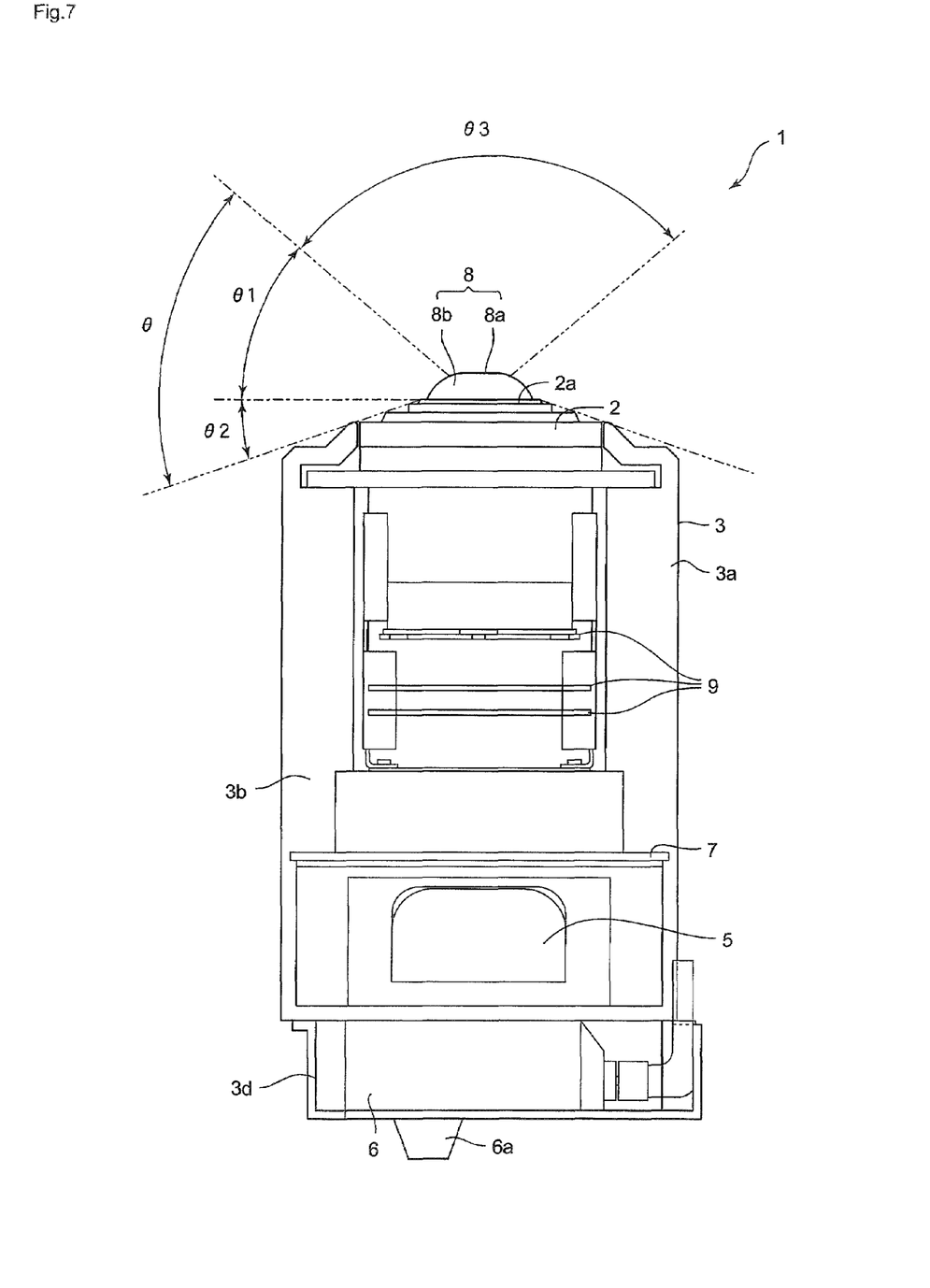
FIG. 7 is an internal configuration explanatory diagram showing an internal configuration of a main body shown in FIG. 1 in a partially perspective state.

As shown in FIG. 7, in addition to one camera module 2, the main body 3 holds a battery 5 for supplying power to the omnidirectional photographing device 1, a remote control light receiving module 6 having a light receiving unit 6a for receiving an optical signal from a remote control (not shown) which operates the display recording unit 4, and a control board 7 for controlling the omnidirectional photographing device 1.

Figure 5:
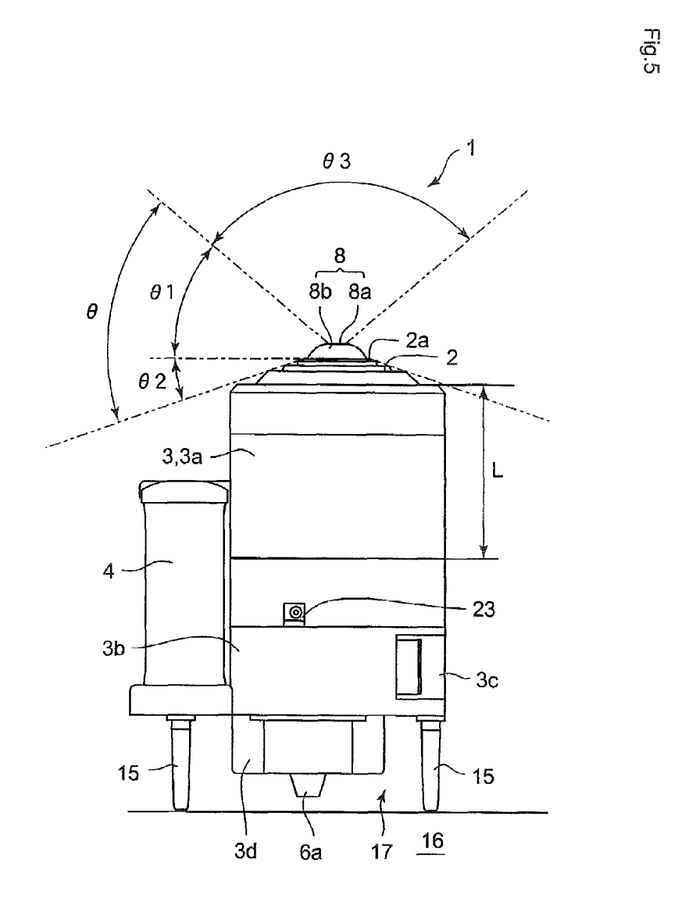
FIG. 5 is a right side view showing a right side of the omnidirectional photographing device shown in FIG. 1.

In the main body 3, an upper portion of a range L shown in FIG. 5 is formed into a cylindrical shape. This cylindrically-shaped portion is a camera module holding unit 3a for holding the camera module 2. A side below the camera module holding unit 3a is formed into a square-cylindrical shape. This square-cylindrically-shaped portion is a battery/board holding unit 3b for holding the battery 5 and the control board 7. As shown in FIG. 5 or the like, a battery cover 3c that can be opened/closed is formed in the battery/board holding unit 3b. Additionally, a side below the battery/board holding unit 3b is a light receiving module holding unit 3d for holding the remote control light receiving module 6.

Figure 8:
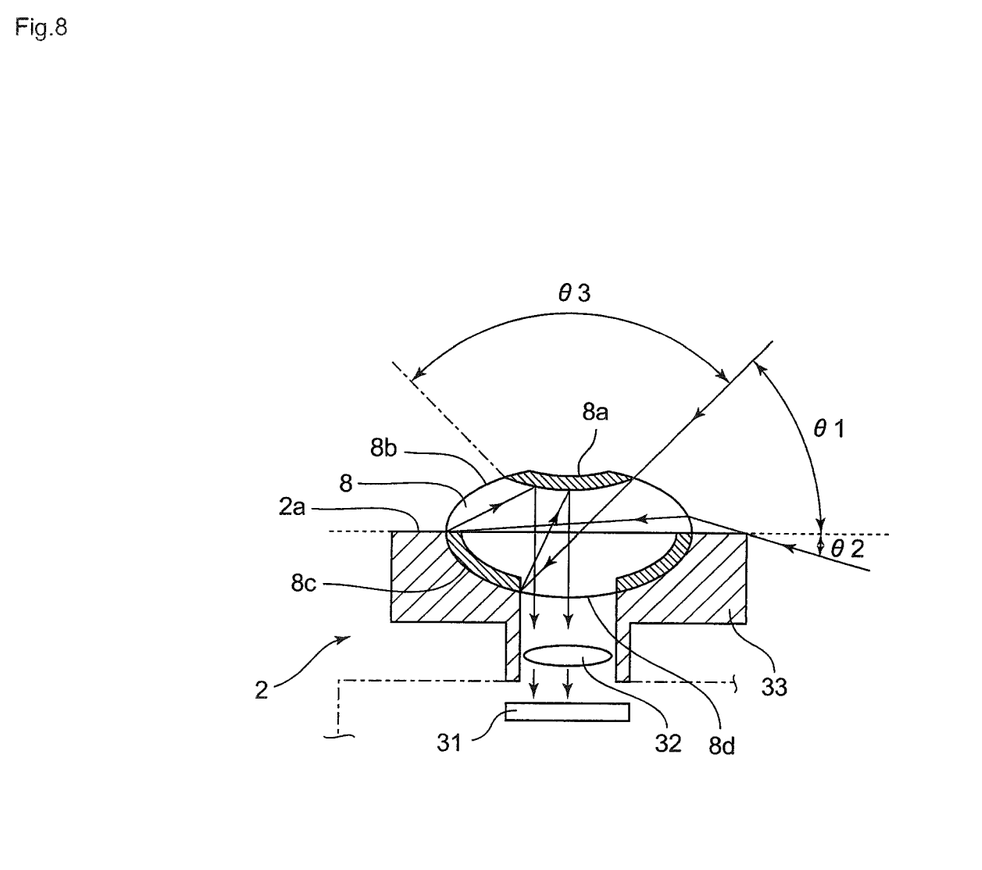
FIG. 8 is a sectional view showing a configuration of a camera module shown in FIG. 1.

As shown in FIG. 8, the camera module 2 includes a lens 8 for directly taking an annular image formed into a 360-degree annular shape seen from above, the CCD type image pickup element 31, a relay lens 32 arranged between the lens 8 and the image pickup element 31, and a holder 33 for holding the lens 8 and the relay lens 32. As shown in FIG. 7, the camera module 2 further includes a plurality of control boards 9 for controlling the image pickup element 31. In the camera module 2, the lens 8, the relay lens 32, the image pickup element 31, and the control board 9 are arranged from an upper end side in this order.

The lens 8 is a special convex glass lens which includes a top reflecting surface 8a formed in a top as an upper end, a roughly annular lens surface 8b formed to surround the top reflecting surface 8a, a roughly annular deep side reflecting surface 8c formed in a mounting unit of the holder 33, and a transmitting surface 8d formed to be surrounded with the deep side reflecting surface 8c. This lens 8 is configured to directly take a 360-degree annular image through the lens surface 8b into the camera module 2 even without using any reflecting mirror. Specifically, the lens 8 is formed into a roughly spherical shape whose up-and-down direction section is formed into an elliptic shape, and held in the holder 33 so that roughly a half of the upper side can be exposed from an upper end of the holder 33, i.e., a lens mounting unit 2a formed in an upper end of the camera module 2. The top reflecting surface 8a and the lens surface 8b area are arranged on the exposed side, and the deep side reflecting surface 8c and the transmitting surface 8d area are arranged on an unexposed side. In other words, the lens 8 is arranged in the upper end of the camera module 2 so that the lens surface 8b can project upward from the lens mounting unit 2a. The top reflecting surface 8a and the deep side reflecting surface 8c are both formed by sticking reflecting materials such as aluminum to the lens 8 by deposition.

The top reflecting surface 8a is formed in the top part of the circular and concave lens 8. This top reflecting surface 8a does not transmit a light from the outside but reflects a light inside the lens 8 to prevent its leakage to the outside.

The lens surface 8b is formed in the exposed side of the lens 8 and the exposed portion excluding the top reflecting surface 8a. In other words, the lens surface 8b in a 360-degree range surrounding the top reflecting surface 8a can transmit a light. Accordingly, the lens surface 8b enables simultaneous taking of 360-degree all-round images.

The deep side reflecting surface 8c reflects the light inside the lens 8 to prevent its leakage to the outside. The transmitting surface 8d transmits a light passed through the lens surface 8b into the lens 8 toward the relay lens 32.

As shown in FIG. 7 or the like, the camera module 2 is held in the camera module holding unit 3a of the main body 3 so that the lens mounting unit 2a can project upward from an upper end of the main body 3. In other words, the lens 8 is arranged to be positioned in the upper end of the omnidirectional photographing device 1 in the state of projecting upward from the main body 3.

Figure 3:
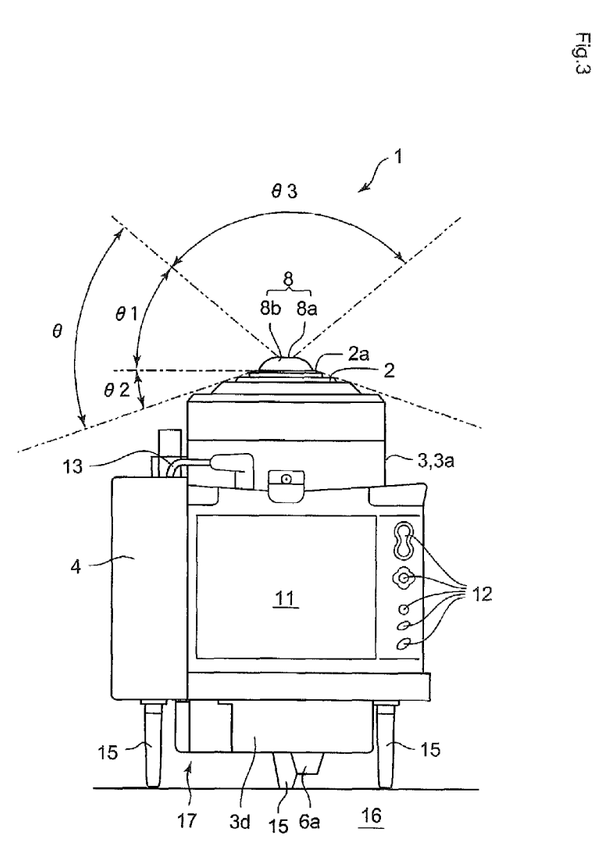
FIG. 3 is a front view of the omnidirectional photographing device shown in FIG. 1.

A field angle θ of the camera module 2 which enables photographing by the lens surface 8b, i.e., a photographing range angle of an up-and-down direction of FIG. 3 or the like, is formed both side of the lens mounting unit 2a in the up-and-down direction of FIG. 3 or the like. Specifically, an elevation angle θ1 is formed as a photographing range angle above a horizontal surface passing through the lens mounting unit 2a (upper end surface of the lens mounting unit 2a according to the embodiment), and a depression angle θ2 is formed as a photographing range angle below the upper end surface of the lens mounting unit 2a. A sum of the elevation and depression angles θ1 and θ2 is set as a field angle θ of the camera module 2. According to the embodiment, for example, the elevation angle θ1 is 38°, and the depression angle θ2 is 17°, and the field angle θ is 55°.

A photographing disable angle θ3 is formed outside the field angle range of the exposed side of the lens 8. Specifically, the photographing disable angle θ3 is formed above the top reflecting surface 8a. According to the embodiment, for example, the photographing disable angle θ3 is 104°. A photographing disable area based on the photographing disable angle θ3 is roughly conical. Thus, the photographing disable area is wider as it is more apart from the top reflecting surface 8a.

Figure 9:
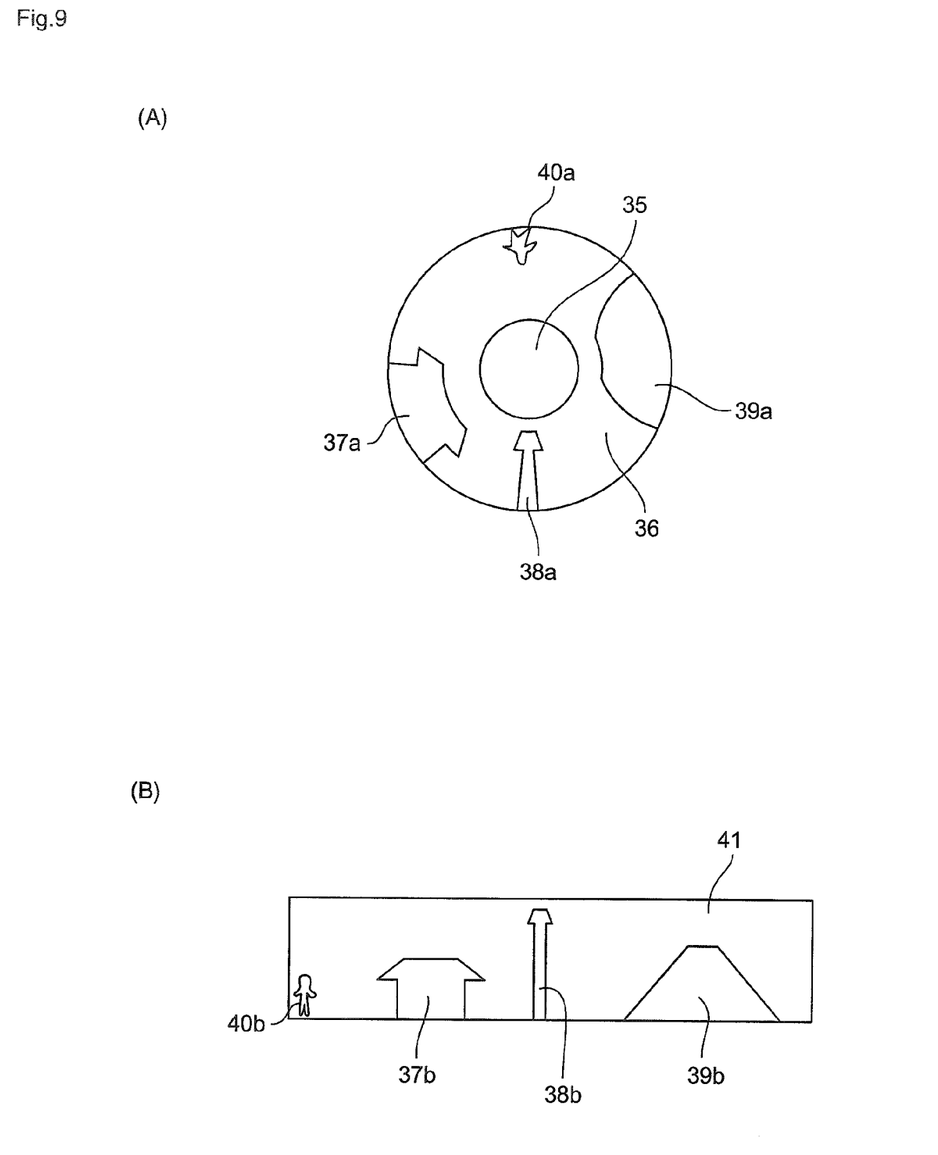
FIG. 9A shows an annular image obtained from an image pickup element.
FIG. 9B shows a horizontally developed panoramic image obtained by processing the annular image shown in FIG. 9A.

Referring to FIGS. 9A and 9B, images obtained by using the camera module 2 will be described. FIGS. 9A and 9B show examples of images photographed outdoors to make annular images clearly understandable. As shown in FIG. 9A, in an annular image obtained from the image pickup element 31, a center circular portion 35 is an image of the top reflecting surface 8a, and an annular portion 36 surrounding the circular portion 35 is a 360-degree annular image. FIG. 9B shows a state where the annular portion 36 is developed into a horizontal panoramic image. Images 37a, 38a, 39a and 40a of the annular portion 36 respectively become images 37b, 38b, 39 and 40b in a horizontally developed panoramic portion 41. Electronic processing for horizontal development is carried out by an image processing unit arranged in the control board 9.

The camera module 2 is similar in kind to the omnidirectional photographing lens described in JP 2003-303335 A. The process of developing the annular image into the panoramic image is achieved by using a processing method described in JP 2003-303335 A, JP 2003-303342 A, JP 2003-303347 A, JP 2003-303348 A, JP 2003-304434 A, JP 2003-304532 A, JP 2003-308526 A, JP 2003-308539 A, or the like.

The battery 5 is a lithium ion battery. This battery 5 is held in the battery/board holding unit 3b. By opening/closing the battery cover 3c, the battery 5 can be fixed to/detached from the main body 3. The remote control light receiving module 6 is held in the light receiving module holding unit 3d. The light receiving unit 6a of the remote control light receiving module 6 projects downward from a lower end of the light receiving module holding unit 3d. The control board 7 is formed into a rectangular flat plate shape. This control board 7 is held in the battery/board holding unit 3b between the camera module 2 and the battery 5.

The display recording unit 4 includes a monitor 11 such as a liquid crystal display for displaying an image photographed by the camera module 2, a hard disk (not shown) for recording the image, and operation buttons 12 arranged on the side of the monitor 11. The display recording unit 4 is fixed to the front side of the main body 3. Specifically, as shown in FIG. 3 or the like, the display recording unit 4 is arranged from a lower side face of the camera module holding unit 3a to a upper side face of the battery/board holding unit 3b on an elevation angle θ2 side and outside a range of a field angle θ of the camera module 2 in an up-and-down direction. In a left-and-right direction, the display recording unit 4 is arranged so that left-and-right direction center positions of the display recording unit 4 and the main body 3 can substantially match each other. Additionally, as shown in FIG. 3 or the like, in a fixed state of the display recording unit 4 to the main body 3, a bottom surface of the display recording unit 4 substantially matches a lower end of the battery/board holding unit 3b (i.e., upper end of the light receiving module holding unit 3d). The display recording unit 4 and the control board 7 held in the main body 3 are electrically connected to each other through a cable 13.

Figure 2:
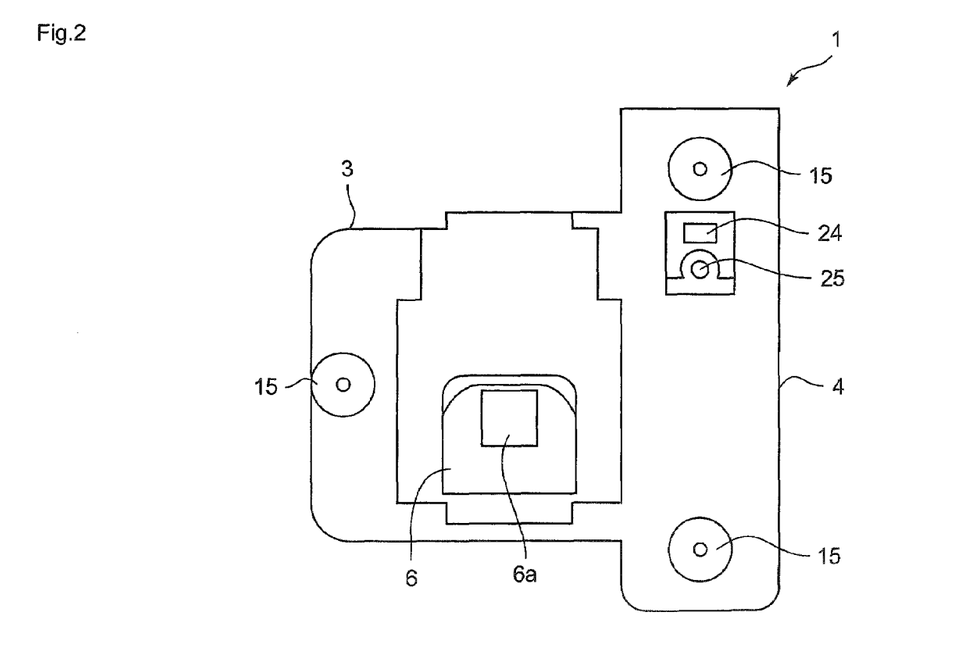
FIG. 2 is a bottom view of the omnidirectional photographing device shown in FIG. 1.

The omnidirectional photographing device 1 of the embodiment includes three spindly cylindrical legs 15 projected downward from both bottom surfaces of the main body 3 and the display recoding unit 4. Specifically, as shown in FIG. 2, two legs 15 are disposed in both left and right ends of the bottom surface of the display recording unit 4. One leg 15 is disposed in a back portion of the bottom surface of the main body 3 having no light receiving module holding unit 3d formed therein, and in a nearly center position of a left-and-right direction. The three legs 15 project downward from a lower end of the light receiving module holding unit 3d of the main body 3, and a lower end of the light receiving unit 6a of the remote control light receiving module 6. In an installed state of the omnidirectional photographing device 1 on a conference table 16, a space 17 is formed between the bottom surfaces of the main body 3 and the display recording unit 4 and an upper surface of the conference table 16.

Figure 6:
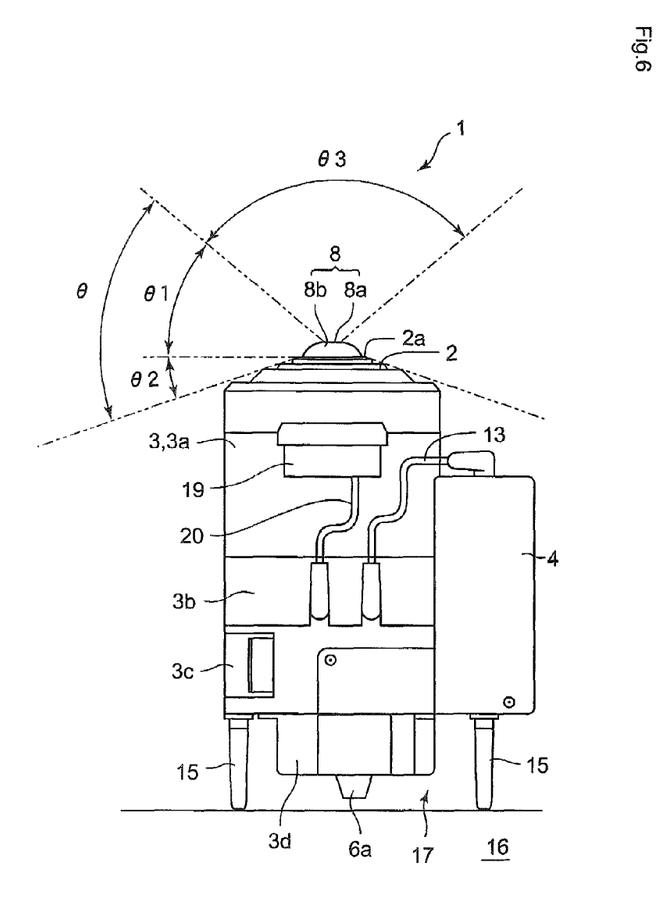
FIG. 6 is a left side view showing a left side of the omnidirectional photographing device shown in FIG. 1.

The omnidirectional photographing device 1 of the embodiment includes a stereo microphone 19 for sound collection. As shown in FIG. 6, this stereo microphone 19 is connected to a left side face of the main body 3 through a cable 20. The stereo microphone 19 is electrically connected to the control board 7 through the cable 20.

The omnidirectional photographing device 1 of the embodiment further includes a power switch 21 for turning on/off the device, a remote control connection port 22 for connecting the remote control (not shown), an AC adaptor connection port 23 for connecting an AC adaptor (not shown) which supplies power to the omnidirectional photographing device 1 in place of the battery 5, a USB connection port 24 for connecting a USB cable (not shown) through which an image recorded in the display recording unit 4 is output to the outside, or the like, and a power source connection port 25 for interconnecting a power source for charging the battery 5 and the omnidirectional photographing device 1.

Figure 4:
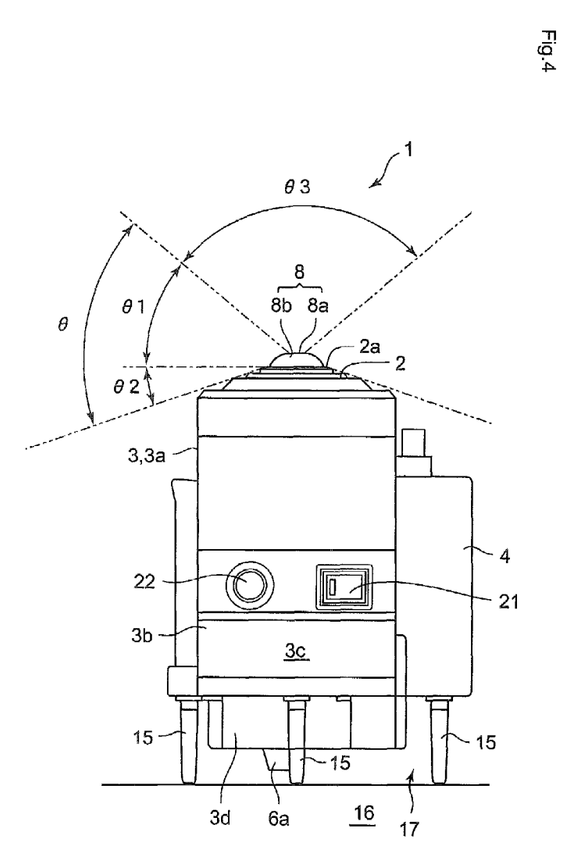
FIG. 4 is a back view of the omnidirectional photographing device shown in FIG. 1.

Specifically, as shown in FIG. 4, the power switch 21 and the remote control connection port 22 are disposed to be arrayed in a left-and-right direction in a position nearly corresponding to the held position of the control board 7 on the back of the main body 3. As shown in FIG. 5, the AC adaptor connection port 23 is disposed in a position nearly corresponding to the held position of the control board 7 on a right side face of the main body 3. Further, as shown in FIG. 2, the USB connection port 24 and the power source connection port 25 are disposed near one of the legs 15 in the bottom surface of the display recording unit 4.

2. Main Effects of the Embodiment

As described above, the omnidirectional photographing device 1 of the embodiment includes one camera module 2 equipped with the lens 8 capable of directly taking a 360-degree annular image when seen from above. The camera module 2 enables photographing of the annular image in a fixed state. Accordingly, the 360-degree annular image can be photographed even by one camera module 2 without using the conventional rotary-driving mechanism or reflecting mirror.

The omnidirectional photographing device 1 of the embodiment includes the display recording unit 4 equipped with the monitor 11 for displaying the image photographed by the camera module 2 and the hard disk for recording the image and fixed to the main body 3. Accordingly, carrying of the omnidirectional photographing device 1 is facilitated. Even without disposing any display device or recording device separately from the omnidirectional photographing device 1, the image photographed by the camera module 2 can be displayed and recorded. Thus, cables conventionally needed for connection to the display device or the recording device are unnecessary. As a result, when the omnidirectional photographing device 1 is used on the conference table 16 as in the case of a television conference or the like, neat arrangement can be made on the conference table 16. Moreover, the omnidirectional photographing device 1 can be installed on the conference table 16 while checking the photographed image on the monitor 11. Hence, even when the installing position of the omnidirectional photographing device 1 is frequently moved, the installing position can be easily checked.

Especially, as the omnidirectional photographing device 1 of the embodiment includes the battery 5, no other power sources are necessary. Accordingly, a power cable is made unnecessary, and when the omnidirectional photographing device 1 is used on the conference table 16, neat arrangement can be made on the conference table 16. Moreover, carrying of the device is further facilitated.

According to the embodiment, the field angle $\theta$ of the camera module 2 is set to provide the elevation and depression angles $\theta 1$ and $\theta 2$ with respect to the upper end surface (plane) of the lens mounting unit 2a disposed in the upper end of the omnidirectional photographing device 1, in other words, the field angle $\theta$ of the camera module 2 is set both side of the lens mounting unit 2a in the up-and-down direction. The display recording unit 4 is arranged outside the range of the field angle $\theta$. Thus, when the omnidirectional photographing device 1 is installed on the conference table 16 as in the case of the embodiment, a scene at the conference table 16 can be photographed within the range of the depression angle $\theta 2$ without any interference from the display recording unit 4. Within the range of the elevation angle $\theta 1$, an image containing faces of participants of a conference can be photographed. As the display recording unit 4 is arranged on the depression angle $\theta 2$ side outside the range of the field angle $\theta$, the display recording unit 4 is arranged on a relatively lower side of the omnidirectional photographing device 1. Thus, a gravity center position of the omnidirectional photographing device 1 is set in the lower side to stabilize the device. According to the embodiment, an installing height of the lens 8 is about 180 cm, an elevation angle $\theta 1$ is 38°, and a depression angle $\theta 2$ is 17°. Thus, the conference table 16 apart by slightly less than 1 m from the omnidirectional photographing device 1 can be photographed, and the faces of the participants apart by 1 m or more from the same can be surely photographed.

According to the embodiment, the camera module 2 is held in the main body 3 to arrange the lens 8 in the upper end, and equipped with three of the legs 15 projected downward more than the bottom surfaces of both of the main body 3 and the display recording unit 4. Thus, when the omnidirectional photographing device 1 is installed on the conference table 16, the space 17 is formed between the upper surface of the conference table 16 and the bottom surface of the omnidirectional photographing device 1. Hence, it is possible to secure ventilation of the bottom surface side of the main body 3 or the display recording unit 4. As a result, even when heat must be released from the display recording unit 4 or the camera module 2, heat releasing can be effectively carried out. As cables connected to the USB connection port 24 or the power source connection port 25 can be arranged to pass through the space 17, cable connection is facilitated, and a directional problem of the device is prevented. Moreover, as the remote control light receiving module 6 can be arranged in the space 17, the device can be easily configured to enable reception from multiple directions.

According to the embodiment, the camera module holding unit 3a of the main body 3 is formed into a cylindrical shape. Thus, the camera module 2 equipped with the lens 8 whose section orthogonal to the up-and-down direction is generally circular can be efficiently arranged in a space of the camera module holding unit 3a. In other words, as compared with a case of forming the camera module holding unit 3a into a square cylindrical shape, the camera module 2 can be arranged with spatial efficiency. The battery/board holding unit 3b is formed into a square cylindrical shape. Accordingly, the control board 7 generally formed into a rectangular flat plate shape can be efficiently arranged in a space of the battery/board holding unit 3b. As a result, the device can be miniaturized.

3. Other Embodiments

The exemplary preferred embodiment of the present invention has been described above. However, the invention is not limited to the embodiment, but various changes and modifications can be made without changing its substance. For example, according to the embodiment, the omnidirectional photographing device 1 includes the display recording unit 4 which has both functions of displaying and recording the photographed image. In addition, the omnidirectional photographing device 1 may include a display unit alone having only a display function in a position of the display recording unit 4, or a recording unit alone having a recording function in the position of the display recording unit 4.

Four display units may be disposed to enable checking of the photographed image from all directions. Further, a display unit may be arranged along an outer periphery of the cylindrical camera module holding unit 3a by using a flexible display unit. A display unit may not be separated from the main body 3 but integrated therewith.

According to the embodiment, the electric connection ports such as the remote control connection port 22 and the AD adaptor connection port 23 are disposed in the side face of the main body 3. In addition, for example, such electric connection ports may be disposed in at least only one of the bottom surfaces of the main body 3 and the display recording unit 4. In such a case, preferably, the electric connection ports should not project from the bottom surface. With this configuration, even when the omnidirectional photographing device 1 is installed on the conference table 16 in a television conference or the like, and the side faces of the device can be viewed from all directions, there is no electric connection port on the side faces, making the device neat in appearance. The electric connection ports may be disposed on the bottom surface side of the projected portion projected from the bottom surface of the omnidirectional photographing device 1 into the lower space, or insertion of the cable into an electric connection port may be facilitated by disposing the electric connection port on the side of the projected portion. In this case, when the omnidirectional photographing device 1 is installed on the conference table 16 in the television conference or the like, the cable can be arranged from any direction. Hence, the device can be used more easily.

As for a camera module, a camera module where an elevation angle alone as a photographing range angel above a horizontal surface passing through the lens mounting unit is set as a field angle may be used for the omnidirectional photographing device. A field angle $\theta$ should preferably be set in a range of 45 to 75°, more preferably in a range of 50 to 70°.

For a conference, considering easy production or photographing a scene at the conference table, a depression angle θ2 should preferably be set in a range of 5 to 25°, more preferably in a range of 10 to 20°. The shape of the camera module holding unit 3a is not limited to the cylindrical shape. Various shapes such as a square cylindrical shape can be employed. The omnidirectional photographing device of the present invention can be used for purposes other than the television conference.

Furthermore, the camera module of the present invention may not be fixed but rotated, or a plurality of camera modules may be integrated into one module. In place of the special lens such as the lens 8, a fisheye lens or another special lens may be used. A plurality of lenses may be combined to enable photographing a 360-degree annular image. According to the embodiment, the image displayed on the monitor 11 is recorded. However, only a part of the image displayed on the monitor 11 may be recorded, or a nondisplayed image may be recorded.

As apparent from the foregoing, according to the present invention, the omnidirectional photographing device equipped with one camera module having the lens capable of directly taking the 360-degree annular image can be configured to be easily carried.

What is claimed is:

1. An omnidirectional photographing device, comprising:
a camera module equipped with a lens capable of directly taking a 360-degree annular image; a main body for holding the camera module; a display unit for displaying an image photographed by the camera module, the display unit being provided to the main body fixedly or integrally;
   a lens mounting unit disposed in one end of the omnidirectional photographing device to mount the lens, wherein a field angle of the camera module is defined to provide an elevation angle and a depression angle with respect to a plane of the lens mounting unit; and the display unit is arranged on the depression angle side of the omnidirectional photographing device, outside a range of the field angle;
   legs projecting downward below bottom surfaces of the display unit, the main body and a lower end of a light receiving module holding unit,
   wherein the camera module is held in the main body to arrange the lens in an upper end of the omnidirectional photographing device; and a space is formed below the bottom surfaces; and a light receiving unit of the light receiving module holding unit project into the space.

2. The omnidirectional photographing device according to claim 1 wherein the main body has a camera module holding portion for holding the camera module, the camera module holding portion being formed into a cylindrical shape.

3. The omnidirectional photographing device according to claim 1 further comprising a predetermined electric connection port projected in or exposed to the space.

4. The omnidirectional photographing device according to claim 3, wherein the main body has a camera module holding portion for holding the camera module, the camera module holding portion being formed into a cylindrical shape.

5. The omnidirectional photographing device according to claim 1, further comprising legs provided to project downward from bottom surfaces of the display unit and the main body, wherein: the camera module is held in the main body to arrange the lens in an upper end of the omnidirectional photographing device; and a space is formed below both of the bottom surfaces.

6. The omnidirectional photographing device according to claim 5, wherein the main body has a camera module holding portion for holding the camera module, the camera module holding portion being formed into a cylindrical shape.

7. The omnidirectional photographing device according to claim 5, further comprising a predetermined electric connection port projected in or exposed to the space.

8. The omnidirectional photographing device according to claim 7, wherein the main body has a camera module holding portion for holding the camera module, the camera module holding portion being formed into a cylindrical shape.

9. An omnidirectional photographing device, comprising:
   a camera module equipped with a lens capable of directly taking a 360-degree annular image; a main body for holding the camera module;
   a recording unit for recording an image photographed by the camera module, the recording unit being provided to the main body fixedly or integrally;
   a lens mounting unit disposed in one end of the omnidirectional photographing device to mount the lens, wherein a field angle of the camera module is defined to provide an elevation angle and a depression angle with respect to a plane of the lens mounting unit; and the recording unit is arranged on the depression angle side of the omnidirectional photographing device, outside a range of the field angle;
   legs projecting downward below bottom surfaces of the recording unit, the main body and a lower end of a light receiving module holding unit, wherein the camera module is held in the main body to arrange the lens in an upper end of the omnidirectional photographing device; and a space is formed below the bottom surfaces; and a light receiving unit of the light receiving module holding unit projects into the space.

10. The omnidirectional photographing device according to claim 9, wherein the main body has a camera module holding portion for holding the camera module, the camera module holding portion being formed into a cylindrical shape.

11. The omnidirectional photographing device according to claim 9, further comprising a predetermined electric connection port projected in or exposed to the space.

12. The omnidirectional photographing device according to claim 11, wherein the main body has a camera module holding portion for holding the camera module, the camera module holding portion being formed into a cylindrical shape.

13. The omnidirectional photographing device according to claim 9, further comprising legs provided to project downward from bottom surfaces of the display unit and the main body, wherein: the camera module is held in the main body to arrange the lens in an upper end of the omnidirectional photographing device; and a space is formed below both of the bottom surfaces.

14. The omnidirectional photographing device according to claim 13, wherein the main body has a camera module holding portion for holding the camera module, the camera module holding portion being formed into a cylindrical shape.

15. The omnidirectional photographing device according to claim 13, further comprising a predetermined electric connection port projected in or exposed to the space.

16. The omnidirectional photographing device according to claim 15, wherein the main body has a camera module holding portion for holding the camera module, the camera module holding portion being formed into a cylindrical shape.

* * * * *